(12) United States Patent
Kemp (10) Patent No.: US 9,256,877 B2
(45) Date of Patent: Feb. 9, 2016

(54) METHOD FOR UPDATING A USER PROFILE (75) Inventor: Thomas Kemp, Esslingen (DE)

(73) Assignee: Sony Deutschland GmbH, Berlin (DE)

( * ) Notice: Subject to any disclaimer, the term of this patent is extended or adjusted under 35 U.S.C. 154(b) by 753 days.

(21) Appl. No.: 11/908,350

(22) PCT Filed: Feb. 22, 2007

(86) PCT No.: PCT/EP2007/001545
§ 371 (c)(1),
(2), (4) Date: Mar. 21, 2008

(87) PCT Pub. No.: WO2007/096169
PCT Pub. Date: Aug. 30, 2007

(65) Prior Publication Data
US 2008/0215709 A1 Sep. 4, 2008

(30) Foreign Application Priority Data

Feb. 22, 2006 (EP) .................................... 06003647
Mar. 17, 2006 (EP) .................................... 06005528

(51) Int. Cl.
*G06F 15/16* (2006.01)
*G06Q 30/00* (2012.01)
*H04L 29/06* (2006.01)

(52) U.S. Cl.
CPC ................ *G06Q 30/00* (2013.01); *H04L 67/40* (2013.01)

(58) Field of Classification Search
USPC .................................................. 709/201–203
See application file for complete search history.

(56) References Cited

U.S. PATENT DOCUMENTS

| 6,169,989 B1* | 1/2001 | Eichstaedt et al. |
| 6,189,008 B1* | 2/2001 | Easty et al. |
| 6,199,099 B1* | 3/2001 | Gershman et al. ............ 709/203 |
| 6,434,568 B1* | 8/2002 | Bowman-Amuah |
| 6,438,579 B1* | 8/2002 | Hosken ......................... 709/203 |
| 6,490,587 B2* | 12/2002 | Easty et al. |
| 6,600,898 B1* | 7/2003 | De Bonet et al. ............ 455/3.04 |
| 6,681,247 B1* | 1/2004 | Payton ......................... 709/217 |

(Continued)

FOREIGN PATENT DOCUMENTS

| JP | 2002-259720 A | 9/2002 |
| JP | 2003-30087 | 1/2003 |

(Continued)

OTHER PUBLICATIONS

U.S. Appl. No. 12/369,352, filed Feb. 11, 2009, Kemp.

(Continued)

*Primary Examiner* — Hua Fan
(74) *Attorney, Agent, or Firm* — Oblon, McClelland, Maier & Neustadt, L.L.P.

(57) ABSTRACT

The invention provides a method for updating a user profile on a server (2) based on user content items on a client (1), the server (2) being able to communicate with the client (1) via a communication network (3), comprising the following steps: a) for each of at least a part of said user content items on the client (1), providing characteristic information suitable to identify a respective user content item; b) transferring the characteristic information of the user content items from the client (1) to the server (2); c) comparing the characteristic information of the user content items with characteristic information suitable to identify the server content items; and d) updating the user profile on the server (2) based on the comparison carried out in c).

20 Claims, 3 Drawing Sheets

(56) References Cited

U.S. PATENT DOCUMENTS

| | | | |
|---|---|---|---|
| 6,697,806 B1* | 2/2004 | Cook | |
| 6,904,449 B1* | 6/2005 | Quinones | 709/203 |
| 6,999,962 B2* | 2/2006 | Julliard et al. | |
| 7,013,325 B1* | 3/2006 | Vivian et al. | 709/203 |
| 7,016,943 B2* | 3/2006 | Freeny | 709/217 |
| 7,035,897 B1* | 4/2006 | Devereaux et al. | 709/203 |
| 7,054,900 B1* | 5/2006 | Goldston | 709/203 |
| 7,069,293 B2* | 6/2006 | Cox et al. | 709/203 |
| 7,076,504 B1* | 7/2006 | Handel et al. | 705/14.39 |
| 7,107,322 B1* | 9/2006 | Freeny, Jr. | 709/217 |
| 7,111,052 B1* | 9/2006 | Cook | 709/219 |
| 7,158,986 B1* | 1/2007 | Oliver et al. | |
| 7,174,377 B2* | 2/2007 | Bernard et al. | 709/224 |
| 7,231,419 B1* | 6/2007 | Gheorghe et al. | 709/203 |
| 7,242,988 B1* | 7/2007 | Hoffberg et al. | 700/28 |
| 7,302,634 B2* | 11/2007 | Lucovsky et al. | 715/200 |
| 7,312,391 B2* | 12/2007 | Kaiser et al. | 84/615 |
| 7,313,591 B2* | 12/2007 | Eames et al. | 709/203 |
| 7,373,110 B1* | 5/2008 | McClain | 455/41.2 |
| 7,389,243 B2* | 6/2008 | Gross | 705/346 |
| 7,428,572 B2* | 9/2008 | Eames et al. | 709/203 |
| 7,454,509 B2* | 11/2008 | Boulter et al. | 709/231 |
| 7,521,620 B2* | 4/2009 | Samadani et al. | 84/600 |
| 7,650,319 B2* | 1/2010 | Hoffberg et al. | 706/45 |
| 7,711,838 B1* | 5/2010 | Boulter et al. | 709/231 |
| 7,721,310 B2* | 5/2010 | Schaffer et al. | 725/46 |
| 7,949,659 B2* | 5/2011 | Chakrabarti et al. | 707/732 |
| 7,962,482 B2* | 6/2011 | Handman et al. | 707/733 |
| 7,991,650 B2* | 8/2011 | Kane, Jr. | 705/26.7 |
| 7,991,757 B2* | 8/2011 | Kane, Jr. | 707/706 |
| 8,028,038 B2* | 9/2011 | Weel | 709/219 |
| 8,028,323 B2* | 9/2011 | Weel | 725/141 |
| 8,082,279 B2* | 12/2011 | Weare | 707/804 |
| 8,122,020 B1* | 2/2012 | Donsbach et al. | 707/732 |
| 8,185,445 B1* | 5/2012 | Perlmuter | 705/26.1 |
| 8,190,203 B2* | 5/2012 | Pelland et al. | 455/556.1 |
| 8,230,099 B2* | 7/2012 | Weel | 709/231 |
| 8,249,948 B1* | 8/2012 | Kane, Jr. | 705/26.7 |
| 8,260,787 B2* | 9/2012 | Lam et al. | 707/748 |
| 8,271,112 B2* | 9/2012 | Fujihara et al. | 700/94 |
| 8,306,976 B2* | 11/2012 | Handman et al. | 707/733 |
| 2002/0104087 A1* | 8/2002 | Schaffer et al. | 725/46 |
| 2002/0152126 A1* | 10/2002 | Lieu et al. | 705/26 |
| 2003/0163518 A1* | 8/2003 | Thurston et al. | 709/203 |
| 2004/0068552 A1* | 4/2004 | Kotz et al. | 709/218 |
| 2004/0073610 A1* | 4/2004 | Terada et al. | 709/203 |
| 2004/0153413 A1* | 8/2004 | Gross | 705/52 |
| 2004/0158503 A1* | 8/2004 | Gross | 705/26 |
| 2004/0162783 A1* | 8/2004 | Gross | 705/51 |
| 2006/0020662 A1* | 1/2006 | Robinson | 709/203 |
| 2006/0206478 A1* | 9/2006 | Glaser et al. | 707/5 |
| 2006/0212442 A1* | 9/2006 | Conrad et al. | 707/5 |
| 2007/0061023 A1* | 3/2007 | Hoffberg et al. | 700/83 |
| 2007/0128899 A1* | 6/2007 | Mayer | 439/152 |
| 2008/0120362 A1* | 5/2008 | Kapoor et al. | 709/203 |
| 2008/0126476 A1* | 5/2008 | Nicholas et al. | 709/203 |
| 2008/0208956 A1* | 8/2008 | Spiridellis et al. | 709/203 |
| 2008/0249843 A1* | 10/2008 | Gross | 705/10 |
| 2009/0177654 A1* | 7/2009 | Beaupre et al. | 707/5 |
| 2009/0177736 A1* | 7/2009 | Christensen et al. | 709/203 |
| 2011/0213769 A1* | 9/2011 | Handman et al. | 707/722 |

FOREIGN PATENT DOCUMENTS

| | | |
|---|---|---|
| JP | 2003-271644 A | 9/2003 |
| JP | 2004-54768 A | 2/2004 |
| JP | 2004-535716 A | 11/2004 |
| JP | 2004-341229 | 12/2004 |
| JP | 2005-11307 A | 1/2005 |
| JP | 2006-53767 | 2/2006 |
| WO | WO 2005/027512 A1 | 3/2005 |
| WO | WO 2005/031517 A2 | 4/2005 |

OTHER PUBLICATIONS

U.S. Appl. No. 12/593,927, filed Sep. 30, 2009, Kemp.
Office Action issued Mar. 6, 2012, in Japanese Patent Application No. 2008-555700 (with English-language translation).
Office Action issued Feb. 23, 2012, in Chinese Patent Application No. 200780006089.0 with English translation.
Office Action issued Feb. 23, 2011, in China Patent Application No. 200780006089.0 (with English translation).
Extended European Search Report issued Mar. 15, 2011, in Application No. / Patent No. 11000246.6-2221.
Extended European Search Report issued Mar. 15, 2011, in Application No. / Patent No. 11000245.8-2221.
European Office Action issued Oct. 4, 2010.
Office Action issued Oct. 23, 2012 in Japanese Patent Application No. 2008-555700 with English language translation.

* cited by examiner

METHOD FOR UPDATING A USER PROFILE

TECHNICAL FIELD

The invention relates to a method for updating a user profile on a server based on user content items on a client as well as a client and a server adapted to communicate with each other for updating the user profile.

BACKGROUND

In personalized streaming data services such as personalized mobile phone based radio or personalized internet radio stations a user has to update his profile on the server manually.

Generally the manual update of the user profile on the server works as follows: First, a user is provided with a selection of server content items. Second, feedback is given by the user indicating which of the content items of the selection he likes/dislikes. Third, the feedback is transferred to the server to update the user profile on the server.

The abovementioned process requires a considerable amount of time due to a large number of manual feedback steps to be carried out by the user until the user profile on the server satisfyingly represents the user's actual preferences.

SUMMARY OF THE INVENTION

It is an object of the present invention to provide a method for updating a user profile on a server which avoids the disadvantages mentioned above.

In order to solve this objective, the present invention provides a method for updating a user profile according to claims 1 and 2. Preferred embodiments of the inventive method are within the scope of the dependent claims. The object underlying the present invention is also achieved by a client, a server, a computer program product, as well as by a computer readable storage means according to independent claims 17, 18, 19, and 20, respectively.

According to the present invention, a method for updating a user profile on a server based on user content items on a client is provided, the server being able to communicate with the client via a communication network, which comprises the steps of a) for each of at least a part of said user content items on the client, providing characteristic information suitable to identify a respective user content item, b) transferring the characteristic information of the user content items from the client to the server, c) comparing the characteristic information of the user content items with characteristic information suitable to identify the server content items; and d) updating the user profile on the server based on the comparison carried out in step c).

In the scope of the present invention, the term "server" may be interpreted as content recommendation system for personalized streaming data services, whereas the term "client" may be interpreted as device used to contact the content recommendation system via the communication network. The client may for example be a mobile phone, a handheld device, a PC, a PDA (Personal Digital Assistant), a games console, or any other networkable device. The client and server are connectable via a network. The network may be wired and/or wireless. The connection may be "always on" (such as with a DSL connection) or may be fleeting (such as with a dial-up connection). Suitable networks/interconnections may include the Internet, intranets, extranets, VPN (Virtual Private Networks), xDSL connections, telephony networks (including GSM/EDGE, 3G (e.g. UMTS), 4G, GPRS, WAP), wireless Ethernet or broadcasting networks.

Within the scope of the present invention, the term of "content item" includes any kind of data which can be transferred via a communication network, for example audio data, video data, A/V data, still images or moving images, text data (e.g. articles), program data (games), or the like.

A user profile may be a data structure within a data memory that may comprise e.g. a user identification (user-ID) and e.g. a list of content items, to which the corresponding user has given a positive feedback and/or a list of content items, to which the user has given a negative feedback. User profiles may also be data base entries, in which a user identification (user-ID) is related to such lists. Another possibility of storing user profiles is to store not the list of content items but of meta data or descriptive data that describes aspects of the content items, which have been positively or negatively rated by said user. For the example of songs, such meta data may comprise, but is not restricted to: names of artists, names of songs, gender of artists, language of songs, decade of publication, commercial success ("top 20"), characteristics of music (rhythm, vocals, etc.), mood (e.g. romantic), etc. For other possible content items similar meta data may be derived. Meta data may be already present in the content items itself (e.g. for mp3-files the artist and the song name can be part of the data file), other meta data may be derived separately and stored in data bases, in which such meta data is related to the content items.

A special meta data is the EuTAG-signature, disclosed in EP1667106, which is generated based on a feature set comprising a plurality of time domain related features. The signature is formed in order to represent a plurality of temporal positions or ranges of a plurality of characteristics of time domain related features within said audio data. Such meta data can serve as a "finger print" to identify such audio data. Since the algorithm to derive said signature is the same on a server and a client, both server and client can derive said signature independently. Said signature can be compared within the client and/or the server in order to determine, which content items are present on both the client and the server in order to use meta data present only on the server to update the user profile.

Meta data can be derived manually and inputted into a data base or can be derived automatically as e.g. by the help of known algorithms based on spectral analyzing, which use signal processing to derive characteristics of the content items.

The transfer of the characteristic information of the user content items from the client to the server is preferably carried out via the communication network. The characteristic information can be regarded as a "map" of the user's preferences that is processed on the server to update and improve the user profile without requiring time consuming manual user feedback. If this characteristic information is a signature, then within the server such signature may be compared with data within a database relating signatures and descriptive meta data and in case the transferred signature is present in the data base the related descriptive meta data can be used for updating a user profile of the user who transferred the signature.

The part of the user content items on the client that are transferred to the server by means of the respective information may include all user content items. However, the part of the user content items may also comprise less than all of the user content items on the client. Whether the part of user content items includes all of the user content items or less may depend from the data size of all the user content items and/or the time amount necessary to transfer the characteristic information of the part of the user content items from the client to the server, for example.

The present invention further provides a method for updating a user profile on a server based on user content items on a client, the server being able to communicate with the client via a communication network, comprising the steps of a) transferring characteristic information from the server to the client, the characteristic information being suitable to identify each of a part of server content items, b) for each of the part of server content items, b1) comparing the respective characteristic information with characteristic information on the client suitable to identify each of the client's content items, b2) generating an automatic feedback information in case the characteristic information of a respective server content item matches with the characteristic information of a user content item, whereas the automatic user feedback information corresponds to one out of possible stages or states of user feedback information, c) transferring the feedback information for each of the part of the server content items from the client to the server, and d) updating the user profile on the server based on the automatic user feedback information and/or user feedback information of each of the part of server content items.

According to a further embodiment it can be provided that—in case the characteristic information of a respective server content item does not match with the characteristic information of a user content item otherwise—b3) generating a user feedback information based on a user input related to the respective server content item and/or based on the absence of an user input is performed, whereas the automatic user feedback information corresponds to one out of possible stages or states of user feedback information.

The transfer of the characteristic information of the part of server content items from the server to the client is preferably carried out via the communication network.

In case of a match of a user content item with one of the server content items belonging to the transferred part of server content items, the automatic feedback information can be generated without any user input such as pressing a key. This allows for providing a very user-friendly feedback, as the user does not have to undergo any action items such as pressing a "like" or "dislike" button. The collection of his content items on the client is used as a "map" of the user's personal taste to update his profile on the server. In order to keep the collection of the user content items on the client secret during the user profile update, the automatic feedback information cannot be distinguished from one out of possible stages or states of user feedback information based on a user input. In case the possible stages or states of user feedback information comprise "like" and "dislike", the automatic user feedback information in case of a match of a user content item with one of the server content items would be chosen as "like" to express that the user likes the respective content item. However, this automatic feedback information cannot be distinguished from the user feedback information obtained from a user input such as from a pressed "like" key. Accordingly, the user content items on the client are kept secret with respect to the server side.

In accordance to another embodiment to the inventive method of updating a user profile on a server the number of possible stages or states of user feedback information equals two. These two stages or states may express the user's sympathy or antipathy with respect to a certain content item and can be rated by the user e.g. by pressing a respective "like" or "dislike button", respectively. However, there can also be more than two stages or states used as feedback information to cope with different stages or states of sympathy or antipathy with respect to a certain content item (e.g. "very good", "good", "ok", "bad", "very bad").

According to a further embodiment of the inventive method the user input comprises explicit and implicit input. In the scope of the present invention, the input process may be part of a rating process or be interpreted as rating process. "Input" can be classified into two categories: "explicit input" and "implicit input". Explicit input may for example be pressing a button "like/dislike" in order to indicate that a content item currently highlighted is appreciated/not appreciated. Implicit input may for example be the fact that a user did initiate/did not initiate ("skip") a transfer process of a particular content item represented by a respectively displayed content item identification (explicit/implicit selection), the speed he scrolls through visually the displayed content item identifications ("skip"), and the like.

According to a still further embodiment of the inventive method, the part of server content items comprises server content items of a content recommendation list that is stored on the server. The content recommendation list may comprise e.g. brand-new audio data that are compared with the user's audio data on the client in order to keep the user profile up to date.

According to a further aspect of the present invention, the characteristic information of a content item corresponds to the content item itself and/or to an identification code identifying the content item. In case the characteristic information of the part of server content items is transferred from the server to the client it is advantageous to transfer, apart from an identification code such as an EuTAG, the content item itself so that the user can process, e.g. listen to or visualize, the content items before giving his user feedback. In case characteristic information for at least a part of said user content items on the client is transferred from the client to the server to perform the comparison and the user update on the server, the characteristic information may merely contain the identification code.

According to a further embodiment of the invention, the method for updating a user profile comprises the step of determining if there are descriptive data available for the respective content item on the server with respect to each of the user content items showing a match with a respective server content item. The descriptive data can be regarded as supplementary information with respect to a content item and can contain attributes like "soft", "aggressive", "Hard-Rock", "Classic", for example. With the support of the descriptive data a user profile can be set up and used for personalized streaming data services, for example.

It is of further advantage, in case descriptive data are available for the respective content item, to update the user profile based on the respective descriptive data.

In case no descriptive data are available for the respective content item, it is of advantage to discard the respective content item when updating the user profile.

It may alternatively in accordance with another embodiment of the invention be advantageous, in case that no descriptive data are available for the respective content item, to analyze the respective content item and update the user profile based on a result of the analysis. The analysis may focus on characteristics in the time domain to classify the respective content item—e.g. into one of several mode classes—and allow for an update of the user profile based thereon.

According to a further embodiment of the invention, in case the user profile comprises a plurality of channels, whereas content items are assignable to at least one channel, an update of the user profile based on the respective content item is conducted merely with respect to the at least one channel. The channels may represent preferred categories of content items of the user such as "Hard-Rock", "80's", "Techno", "Classic".

In accordance with another embodiment of the inventive method for updating a user profile, further steps of rating the respective content item with respect to each of the channels, and determining the at least one channel as the channel having the best rating are carried out. By assigning a specific content item to the channel "Hard-Rock" and updating the user profile based on that specific content item merely with respect to the channel "Hard-Rock", it is prevented that the user profile with respect to further channels like "80's" or "Techno" is misleadingly updated by an improper content item.

Alternatively the respective content item is discarded from updating the user profile in case the best rating does not exceed a predetermined minimum rating. Thus, it can be avoided that a content item that cannot be appropriately assigned to a specific channel deteriorates the user profile.

Additionally or alternatively, said at least one channel as the channel having the best rating may be updated as a best channel.

According to an embodiment of the present invention, the at least one channel is a single channel. Thus, an update of the user profile based on a specific content item is restricted to solely one channel, which further improves the quality of the user profile update.

According to a further embodiment of the invention, a user input is requested on the client prior to carrying out the steps for updating the user profile and the update of the user profile is either continued, retarded or cancelled depending on the user input. The user input request may be directed to a confirmation to update the user profile on the server based on the user content items on the client.

The present invention further provides a client being adapted to communicate with a server via a communication network for updating a user profile on the server based on user content items on the client, comprising means for receiving characteristic information from the server, the characteristic information being suitable to identify each of a part of server content items, means for comparing the respective characteristic information for each of the part of server content items with characteristic information on the client suitable to identify each of the client's content items, means for generating an automatic feedback information in case the characteristic information of a respective server content item matches with the characteristic information of a user content item and for generating a user feedback information based on a user input related to the respective server content item, whereas the automatic user feedback information corresponds to one out of possible stages or states of user feedback information, and means for transferring the feedback information for each of the part of the server content items from the client to the server.

The present invention also provides a server being adapted to communicate with a client via a communication network for updating a user profile on the server based on user content items on the client, comprising means for receiving characteristic information of at least part of the user content items from the client, said characteristic information being suitable to identify a respective user content item, means for comparing the characteristic information of the user content items with characteristic information suitable to identify the server content items, and means for updating the user profile on the server based on the comparison carried out in said comparison means.

Additionally a computer program product is provided, comprising computer program means, which is adapted to perform a method according to the invention or to at least partially embody the client and/or the server according to the invention.

Further additionally or alternatively, a computer readable storage medium is provided, comprising a computer program product according to the invention.

These and further aspects of the present invention will be further discussed in the following:

In personalized streaming audio services like personalized mobile phone based radio, personalized internet radio stations, the user has to personalize his channels manually, in most cases by first selecting categories he "likes" or "dislikes" and then repeatedly select songs he "likes" or "dislikes". This process, i.e. update of the user profile, is time consuming and leads to feasible personalization results only after a large number of such feedback operations have been carried out.

In order to speed up this process to update the user profile it is proposed to utilize the collection of user content items, e.g. songs, on a client, e.g. a PC or mobile phone, as an indicator of the user's preferences.

Modern smart mobile phones also act as mobile mp3 players in many cases. Therefore it is proposed to utilize the mp3 songs in the mobile phones memory to update and improve the user profile.

Firstly the music on the phone is identified against the music stored on a server, e.g. by locally computing a small identifier on the cellphone (e.g. as EuTAG), and the identifier is transferred to the server. Using the identifiers the server looks up which music is also stored on the server and about which of the songs there are metadata available. All songs where no metadata are available may be discarded. With the remaining songs, the user profile is updated.

The user profile update can be carried out using the same method that is applied to recommendation systems in the case of an explicit "like" rating of the user. In the context of a system that features many music channels, like the StreamMan of SONY or VodafoneRadioDJ of Vodafone, however, this approach is advantageously refined, since even if a user likes Elvis songs this does not mean that Elvis songs should be used to update his/her "Dance Music 1990's" channel. In this case the system preferably rates the songs in the user's collection on the client versus all active channels of this user and assigns each of the songs into one of those channels to update the characteristic of the respective channel. Advantageously the songs are assigned to the channels for which the best rating is found, respectively. The update of the user profile with a song of the user's collection is carried out with respect to the characteristic of the channel for which the best rating is found.

Whenever the song collection of the user changes. the process of updating the user profile may be repeated, so that e.g. all song identifiers are recomputed and sent to the server again.

Since there may be privacy objections of the user against an upstreaming of the information about the songs in his mobile phone to a server, it is also proposed to compute the identifier of e.g. all song recommendations on the server, stream them together with the song to the mobile phone and let the mobile phone check if any of those recommendations is available in the mobile phone's memory. If this is the case, the mobile phone will send back an information message to the server stating that a "like" button is pressed, so that the server cannot distinguish whether the user has explicitly pressed the "like" button or whether this goes back to an automated process. In this way, the privacy of the user is maintained and there is no more need for explicit rating by the user.

All different aspects of the present invention as set out above and further elucidated below might be combined in any way. The accompanying drawings, which are incorporated in and constitute a part of the specification, illustrate an exemplary embodiment of the invention, and, together with a general description of the invention given above, and the detailed description of the embodiments given below, serve to explain the principles of the invention, wherein:

BEST MODE FOR CARRYING OUT THE INVENTION

Figure 1:
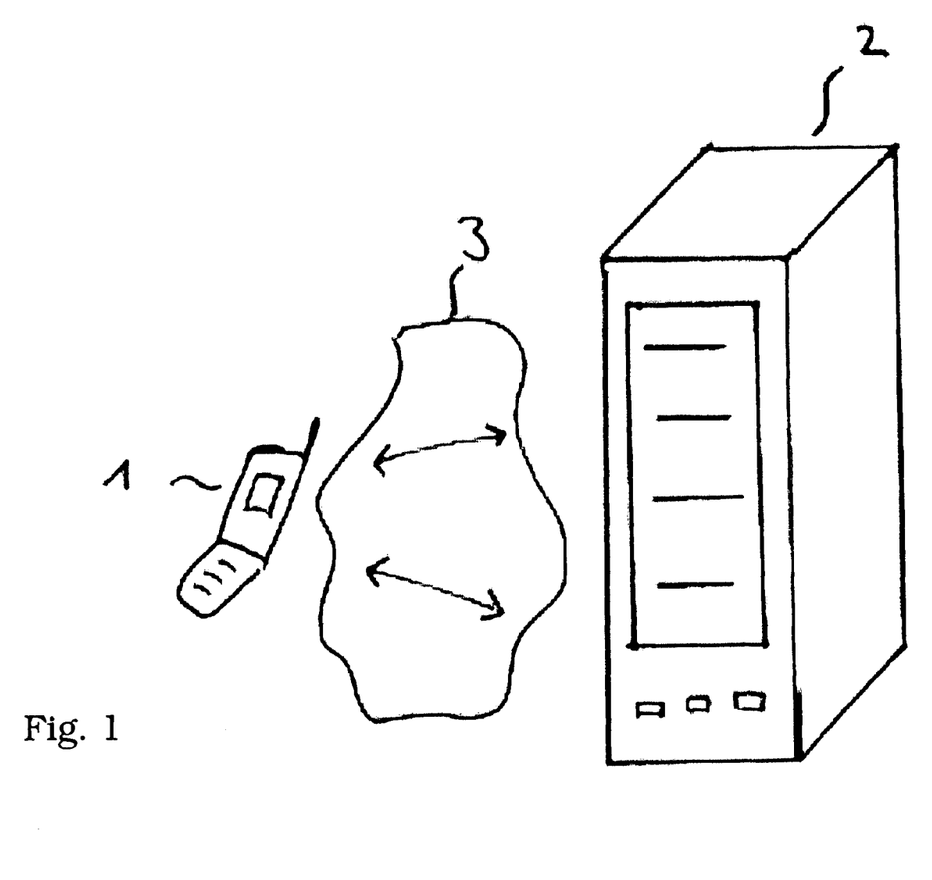
FIG. 1 shows an embodiment of a client and a server to carry out a user profile update according to the invention.

FIG. 1 shows an embodiment of a client 1 and a server 2 that can communicate with each other via a communication network 3 for updating a user profile.

The user profile update that can be carried out with the client-server system and the communication network 3 shown in FIG. 1 will be described in further detail with respect to FIGS. 2 and 3.

Figure 2:
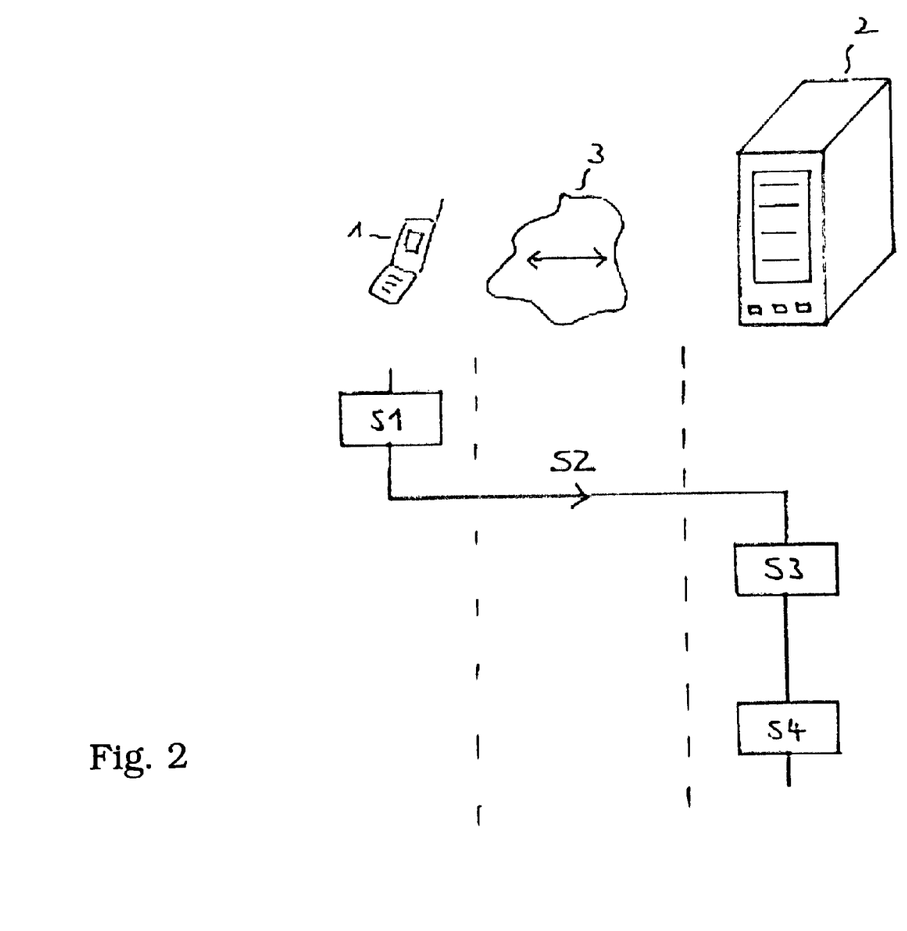
FIG. 2 shows an embodiment of a method for updating a user profile according to the invention.

FIG. 2 schematically illustrates an embodiment of a method for updating a user profile on the server 2 based on user content items on the client 1, the server 2 being able to communicate with the client via the communication network 3. The method steps that are carried out are schematically denoted as boxes with subsequent labelling arranged along an action line. Whenever the action line moves from the left hand side of the figure, where the method steps are carried out in the client, to the right hand side of the figure, where the method steps are carried out in the server, or vice versa, data are transferred between the client 1 and the server 2. The direction of data transfer is denoted by an arrow. This illustration is also valid for the following FIG. 3.

In step S1 of FIG. 2, at least for a part of the user content items that are stored on the client, characteristic information suitable to identify a respective user content item is provided. The characteristic information may be an identification code identifying the content item such as the EuTAG. Next, in step S2 the characteristic information of the user content items is transferred from the client 1 to the server 2 via the communication network 3. In the following step S3 the server 2 compares the characteristic information of the user content items that were received from the client 1 via the communication network 3 with characteristic information suitable to identify the server content items stored on the server 2. Next, the user profile on the server 2 is updated in step S4 based on the comparison carried out in step S3. The user profile update may involve descriptive data associated with the content items for which a match is found. In case the server 2 manages a plurality of channels for the user, the user profile update with regard to a specific user content item may only affect the user profile with respect to one or to at least one channel. Thus, an impact of a user content item on the user profile with respect to channels holding content items with completely different properties is avoided (e.g. a rock song would not influence the user profile with respect to a classic channel).

Figure 3:
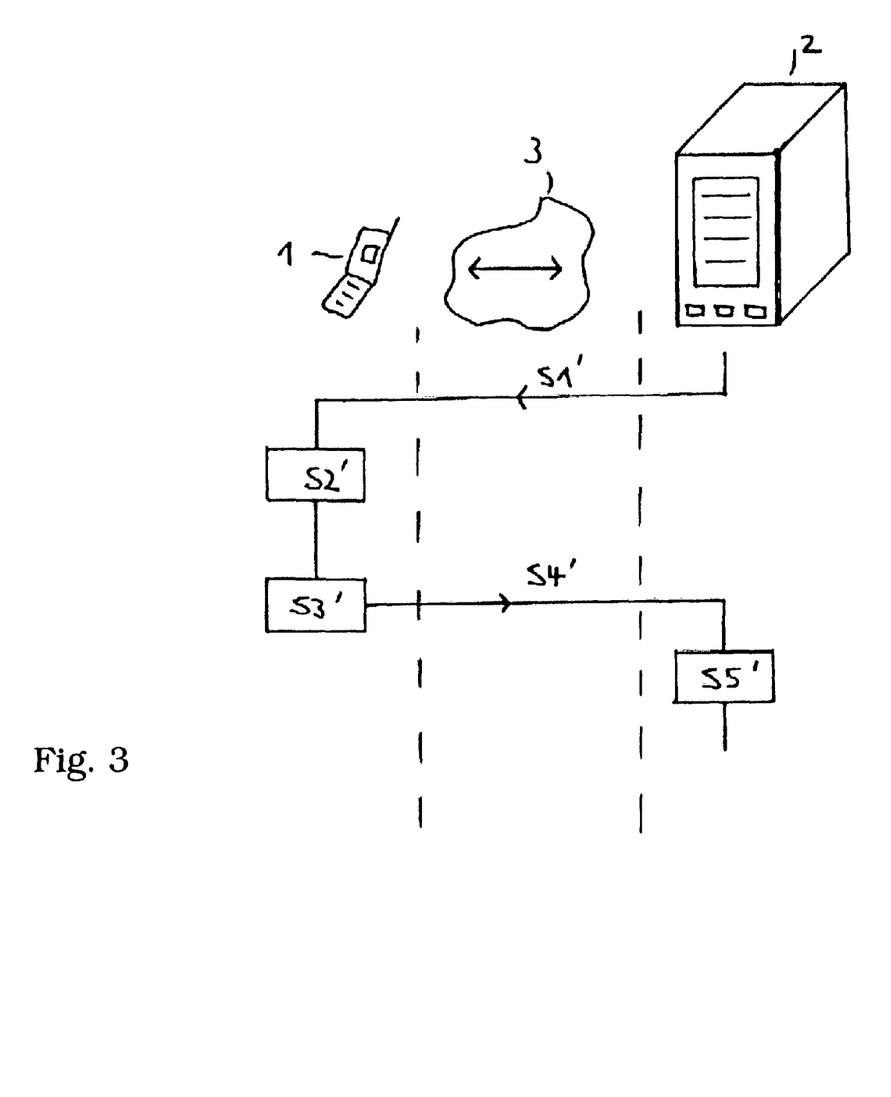
FIG. 3 shows a further embodiment of a method for updating a user profile according to the invention.

FIG. 3 schematically illustrates a further embodiment of a method for updating a user profile on the server 2 based on user content items on the client 1, the server 2 being able to communicate with the client 1 via the communication network 3. First, in step S1', characteristic information is transferred from the server 2 to the client 1, the characteristic information being suitable to identify each of a part of server content items. The characteristic information may comprise the data of the content item itself as well as an identification code identifying the content item, for example. Next, in step S2', for each of the part of server content items, the respective characteristic information is compared with characteristic information on the client suitable to identify each of the client's content items. In the following step S3', an automatic feedback information is generated in case the characteristic information of a respective server content item matches with the characteristic information of a user content item, otherwise a user feedback information based on a user input related to the respective server content item is generated, whereas the automatic user feedback information corresponds to one out of possible stages or states of user feedback information. The automatic user feedback information corresponds to a stage or state of "like" out of possible stages or states "like" and "dislike", for example. Thus, the automatic user feedback information cannot be distinguished from user feedback information based on manual user input due to hitting a "like" button. Next, in step S4', the feedback information, i.e. automatic user feedback information and/or user feedback information based on a user input, is transferred for each of the part of the server content items from the client 1 to the server 2. In the following step S5', the user profile is updated on the server based on the automatic user feedback information and/or user feedback information with respect to the part of server content items.

As already mentioned with respect to the previous embodiment, the user profile update may involve descriptive data associated with the content items for which a match is found and the update may also only affect the user profile with respect to one or to at least one channel in case the user profile supports multiple channels.

The user profile stored on the server 2 may be involved in personalized streaming data services and the user profile that is stored on the server 2 may influence data transfer between the server and multiple clients of the user. Thus, it is possible, that the song collection of a user that is stored on his/her mobile phone is used to update the user profile on the server, whereas song recommendations on the server are also transferred to a PC as a further client of the user, for example.

REFERENCE SYMBOLS 1 client
2 server
3 communication network

The invention claimed is:

1. A method for updating a user profile on a server based on user content items stored on a client, the server being able to communicate with the client via a communication network, comprising:
 a) for each of said user content items stored on the client, providing characteristic information suitable to identify a respective user content item;
 b) transferring the characteristic information of the user content items from the client to the server;
 c) comparing the characteristic information of the user content items stored on the client device with characteristic information stored on the server and suitable to identify the server content items; and
 d) updating the user profile on the server based on the comparison carried out in c) by generating automatic feedback in response to the characteristic information of the user content items stored on the client device matching characteristic information stored on the server and generating user feedback information based on a user input related to the respective server content item, wherein the user profile comprises a plurality of channels, one of the user content items is assignable to at least one of the plurality of channels, and the user profile is updated, based on the respective user content item, merely with respect to a respective one of the plurality of channels to which the respective user content item is assignable, wherein steps b-d are repeated each time a user content item is added to and/or deleted from the client, wherein the user input includes explicit and implicit input, and wherein the implicit input is based in part on skipping of a transfer process of a server content item.

2. The method according to claim 1, wherein the implicit input is further based on a scroll speed of a visually displayed content item.

3. A method for updating a user profile on a server based on user content items on a client, the server being able to communicate with the client via a communication network, comprising:

a) transferring characteristic information from the server to the client, the characteristic information being suitable to identify each of a part of server content items;

b) for each of the part of server content items:

b1) comparing, at the client, the respective characteristic information received from the server with characteristic information stored on the client suitable to identify each of the client's content items, and b2) in response to the characteristic information of a respective server content item matching with the characteristic information of a user content item stored on the client device, generating, at the client, automatic feedback information, or b3) in response to the characteristic information of a respective server content item not matching with the characteristic information of a user content item stored on the client device, generating, at the client, user feedback information based on a user input related to the respective server content item or based on the absence of an user input, wherein the automatic feedback information and the user feedback information correspond to one out of possible stages or states of user feedback information;

c) transferring, from the client to the server, the feedback information for each of the part of the server content items; and d) updating the user profile at the server based on the automatic user feedback information and/or user feedback information of each of the part of server content items, wherein the part of server content items comprises server content items of a content recommendation list stored on the server, wherein step b is repeated each time a user content item is added to and/or deleted from the client, wherein the user input includes explicit and implicit input, and wherein the implicit input is based in part on skipping of a transfer process of a server content item.

4. The method according to claim 3, wherein a number of possible stages or states of user feedback information equals two.

5. The method according to claim 3, wherein the characteristic information of a content item corresponds to the content item itself and/or to an identification code identifying the content item.

6. The method according to claim 3, wherein the updating the user profile at the server further comprises:

for each of the user content items showing a match with a respective server content item, determining if there is descriptive data available for the respective server content item on the server.

7. The method according to claim 6, further comprising, in case descriptive data are available for the respective server content item, updating the user profile based on the descriptive data available for the respective server content item.

8. The method according to claim 6, further comprising, in case no descriptive data are available for the respective server content item, discarding the respective server content item when updating the user profile.

9. The method according to claim 3, further comprising, in case no descriptive data are available for the respective server content item, analyzing the respective server content item and updating the user profile based on a result of the analysis.

10. The method according to claim 3, wherein, in case the user profile comprises a plurality of channels, whereas content items are assignable to at least one channel, updating the user profile based on the respective server content item merely with respect to the at least one channel.

11. The method according to claim 10, further comprising:

rating the respective server content item with respect to each of the channels; and determining at least one channel as a channel having a best rating.

12. The method according to claim 11, wherein the channel having the best rating is updated as a best channel.

13. The method according to claim 10, wherein each channel relates to a type of content item.

14. The method according to claim 3, wherein the respective server content item is discarded from updating the user profile in case a best rating does not exceed a predetermined minimum rating.

15. The method according to claim 3, wherein a user input is requested on the client prior to carrying out the steps as defined in any one of the preceding claims and the updating the user profile is either continued, retarded or cancelled depending on the user input.

16. A non-transitory computer-readable storage medium having embedded therein instructions, which when executed by a processor, cause the processor to perform a method according to claim 3.

17. The method according to claim 3, wherein the automatic feedback information cannot be distinguished from manually entered user input.

18. A client being configured to communicate with a server via a communication network for updating a user profile on the server based on user content items on the client, comprising:

circuitry configured to receive characteristic information from the server, the characteristic information being suitable to identify each of a part of server content items;

compare the respective characteristic information received from the server for each of the part of server content items with characteristic information stored on the client suitable to identify each of the client's content items;

generate automatic feedback information in response to the characteristic information of a respective server content item matching with the characteristic information of a user content item stored on the client device, and for generating user feedback, in response to the characteristic information of a respective server content item not matching with the characteristic information of a user content item stored on the client device, information based on a user input related to the respective server content item, wherein the automatic user feedback information corresponds to one out of possible stages or states of user feedback information; and transfer the feedback information for each of the part of the server content items from the client to the server, wherein the part of server content items comprises server content items of a content recommendation list stored on the server, wherein steps the circuitry performs the receiving, comparing and generating each time a user content item is added to and/or deleted from the client, wherein the user input includes explicit and implicit input, and wherein the implicit input is based in part on skipping of a transfer process of a server content item.

19. A server being configured to communicate with a client via a communication network for updating a user profile on the server based on user content items on the client, comprising:

circuitry configured to transfer characteristic information to the client, the characteristic information being suitable to identify each of a part of server content items;

receive feedback information generated at the client corresponding to at least a part of said characteristic information, said part of said characteristic information being suitable to identify a respective user content item stored on the client; and update the user profile on the server based on the feedback information, wherein the part of server content items comprises server content items of a content recommendation list stored on the server, wherein the feedback information is one of automated feedback information and user feedback information, the automated feedback information being generated in response to the characteristic information received from the server matching characteristic information stored on the client, the user feedback information being based on a user input related to the respective server content item and generated in response to the characteristic information received from the server not matching characteristic information stored on the client, wherein the generation of the automated feedback information is repeated each time a user content item is added to and/or deleted from the client, wherein the user input includes explicit and implicit input, and wherein the implicit input is based in part on skipping of a transfer process of a server content item.

20. A method for updating data, including a user profile, stored on a server based on user content items stored on a client, the server being able to communicate with the client via a communication network, comprising the following steps:

a) for each of said user content items stored on the client, determining characteristic information suitable to identify a respective user content item;

b) transferring the characteristic information of the user content items from the client to the server;

c) comparing the characteristic information of the user content items stored on the client device with characteristic information stored on the server and suitable to identify the server content items;

d) updating, via a processor, the user profile based on the comparison carried out in c) by generating automatic feedback in response to the characteristic information of the user content items stored on the client device matching characteristic information stored on the server and generating user feedback information based on a user input related to the respective server content item;

storing the user profile on the server, wherein the user profile comprises a plurality of channels, one of the user content items is assignable to at least one of the plurality of channels, and the user profile is updated, based on the respective user content item, merely with respect to a respective one of the plurality of channels to which the respective user content item is assignable, wherein steps b-d are repeated each time a user content item is added to and/or deleted from the client, wherein the user input includes explicit and implicit input, and wherein the implicit input is based in part on skipping of a transfer process of a server content item.

* * * * *